(12) United States Patent
Shin et al.

(10) Patent No.: US 10,346,368 B2
(45) Date of Patent: Jul. 9, 2019

(54) METHOD AND APPARATUS OF PER-BLOCK-GROUP JOURNALING FOR ORDERED MODE JOURNALING FILE SYSTEM

(71) Applicant: RESEARCH & BUSINESS FOUNDATION SUNGKYUNKWAN UNIVERSITY, Suwon-si (KR)

(72) Inventors: Dong Kun Shin, Seoul (KR); Yun Ji Kang, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 453 days.

(21) Appl. No.: 14/751,583

(22) Filed: Jun. 26, 2015

(65) Prior Publication Data
US 2015/0379036 A1   Dec. 31, 2015

(30) Foreign Application Priority Data

Jun. 30, 2014 (KR) .................. 10-2014-0080942

(51) Int. Cl.
*G06F 7/00* (2006.01)
*G06F 16/18* (2019.01)

(52) U.S. Cl.
CPC ...... *G06F 16/1865* (2019.01); *G06F 16/1815* (2019.01)

(58) Field of Classification Search
CPC .................. G06F 17/30191; G06F 16/1865
See application file for complete search history.

(56) References Cited

U.S. PATENT DOCUMENTS

| 9,020,987 B1 * | 4/2015 | Nanda ................ G06F 3/06 707/821 |
| 2012/0137299 A1 | 5/2012 | Moyer |
| 2012/0179730 A1 * | 7/2012 | Slegers ............ G06F 17/30227 707/822 |

FOREIGN PATENT DOCUMENTS

| KR | 10-0453228 B1 | 10/2004 |
| KR | 10-2005-0052016 A | 6/2005 |
| KR | 10-2010-0094157 A | 8/2010 |
| KR | 10-0981064 B1 | 9/2010 |

OTHER PUBLICATIONS

Y. Kang, et al., "Per-Block-Group Journaling for Improving Fsync Response Time", Proceedings from the 18$^{th}$ IEEE International Symposium on Consumer Electronics (ISCE 2014), held at Jeju Grand Hotel, Jeju, Republic of Korea, on Jun. 22-25, 2014, paper presented on Jun. 23, 2014, pp. 186-187 (4 pages, in English).

* cited by examiner

*Primary Examiner* — Ajith Jacob
(74) *Attorney, Agent, or Firm* — NSIP Law (57) ABSTRACT

In accordance with a first exemplary embodiment, there is provided a computing device. The device includes a memory equipped with a program operating a file system supporting ordered mode journaling; and a processor operating the program stored in the memory. Wherein according to execution of the program, when an fsync system call for the file stored in the memory occurs, the processor extracts a block-group-level transaction corresponding to the file from a compound transaction including the file, records the transaction in a data area of the memory, and executes journaling of the transaction in a journal area of the memory.

15 Claims, 6 Drawing Sheets

METHOD AND APPARATUS OF PER-BLOCK-GROUP JOURNALING FOR ORDERED MODE JOURNALING FILE SYSTEM

CROSS-REFERENCE TO RELATED APPLICATION

This application claims the benefit of Korean Patent Application No. 10-2014-0080942 filed on Jun. 30, 2014, the disclosures of which are incorporated herein by reference.

TECHNICAL FIELD

The embodiments described herein pertain generally to a method and an apparatus of per-block-group journaling for an ordered mode journaling file system.

BACKGROUND

An operation system in a common computing device accesses a storage device and uses a file system to read and write the file. A file system, which has been recently used in most computing devices, is EXT4 (extended file system 4). EXT4 is a file system supporting journaling to guarantee consistency and maintainability. Journaling is a technique that can restore the file system fast, when the system is suddenly terminated due to occurrence of a system failure, a supply error or other problems. EXT4 periodically records a journal log in a journal area, which is a pre-reserved area of the storage device, in order to execute the journaling.

The journaling method of EXT4 supports a write-back mode, an ordered mode, and a data mode. The ordered mode is a basic option for the journaling method of EXT4. To maintain the consistency of the file system, the ordered mode records only metadata in the journal area after all data that need to be updated are recorded in the storage device.

When the journaling method is executed, a journal thread executed in a background is used for data storage requiring the longest time. As such, long response time resulting therefrom may not be a problem. However, since an fsync system call is not executed in a background, the response time of the journaling may be critical upon the fsync system call.

The fsync system call is a system call function of Linux. The fsync system call is intended to be guaranteed as to whether changes in a file designated by a user have been surely recorded in the storage device. In EXT4, the fsync system call records all corrected metadata of a compound transaction in the journal area by using the journaling thread. In this case, the compound transaction is a group of file system updates. When a file calculation occurs, EXT4 executes journaling per compound transaction, instead of executing journaling per single transaction. The compound transaction may include a file, which is not included in the fsync system call. If there are significant changes in a file that has not been requested, the execution time for the fsync system call may increase.

Conventional inventions to solve this problem are described below.

Korean Patent Publication No. 10-0981064 (Title of Invention: "A Method to Maintain Software Raid Consistency Using Journaling File System") describes a journaling method, which updates information by registering a journal transaction descriptor block, a data block, and a metadata block in a memory buffer. This method splits a storage area into a multiple number of block groups, and executes journaling by using each of the blocks. The block generated in this invention is stored in a cache, and simultaneously, used to be stored in a disk during an ordered journaling process. However, since the block generated in this invention is stored in a cache, and simultaneously, used to be stored in a storage device during an ordered journaling process, an amount of metadata and files to be processed at a time is maintained. Thus, the execution time for the fsync system call is not reduced.

Korean Patent Publication No. 10-2005-0052016 (Title of Invention: "Method of and apparatus for logging and restoring the meta data in file system") describes changing metadata per transaction, and stores a log of the changed metadata in a global log buffer unit. This method identifies any change in the metadata stacked in the buffer by using the metadata log, and stores the change in a disk. However, since this method executes journaling per transaction, it cannot solve the problem of increase of execution time for the fsync system call resulting from storing unnecessary files when the fsync system call is executed.

In addition, Korean Patent Publication No. 10-0453228 (Title of Invention: "Journaling and Recovery Method of Shared Disk File System") describes identifying any change in metadata stacked in a buffer by using a metadata log and storing the change in a storage device. Since this invention also executes journaling per transaction, execution time for the fsync system call may increase due to storing of unnecessary files upon the execution of the fsync system call.

SUMMARY

In view of the foregoing, example embodiments provide a method and an apparatus of per-block-group journaling for a file system supporting ordered mode journaling.

However, the problems sought to be solved by the present disclosure are not limited to the above description, and other problems can be clearly understood by those skilled in the art from the following description.

In accordance with a first exemplary embodiment, there is provided a computing device. The device includes a memory equipped with a program operating a file system supporting ordered mode journaling; and a processor operating the program stored in the memory. Wherein according to execution of the program, when an fsync system call for the file stored in the memory occurs, the processor extracts a block-group-level transaction corresponding to the file from a compound transaction including the file, records the transaction in a data area of the memory, and executes journaling of the transaction in a journal area of the memory.

In accordance with a second exemplary embodiment, there is provided an ordered mode journaling method of a file system. The method includes occurring an fsync system call for a file stored in a memory; extracting a block-group-level transaction corresponding to the file from a compound transaction including the file, according to the fsync system call; recording the transaction in a data area of the memory; and executing journaling of the transaction in a journal area of the memory.

In accordance with the example embodiments, a method and an apparatus of per-block-group journaling for a file system supporting ordered mode journaling can be provided, and as a result, are expected to result in various ripple effects throughout the relevant businesses.

Upon execution of an fsync system call in the file system supporting ordered mode journaling, the example embodiments use only a block-group-level transaction corresponding to the fsync system call, and thus, the consistency of the file system can be maintained. Further, since the example embodiments can record minimum metadata and data, it is possible to prevent deterioration of performance of the computing device resulting from an application frequently using a fsync system call.

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

In describing the example embodiments with reference to the drawings, drawing reference numerals may vary depending on the drawings, even though they refer to the same component, and the drawing reference numerals are described merely for convenience in description. Thus, a conception, a feature, a function or an effect of each component should not be restrictively constructed by its corresponding drawing reference numeral.

First, an fsync system call processing process using ordered mode journaling in EXT4, which is a conventional file system, is described with reference to FIG. 1A and FIG. 1B.

Figure 1A:
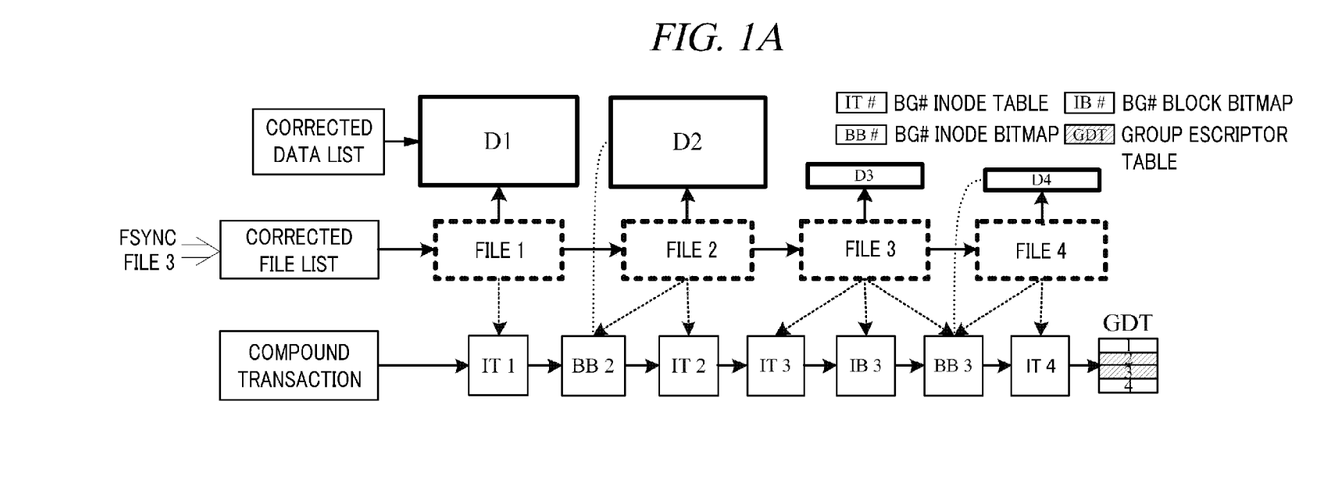
FIG. 1A is an illustrative diagram of an fsync system call processing process using ordered mode journaling in conventional EXT4.
Figure 1B:
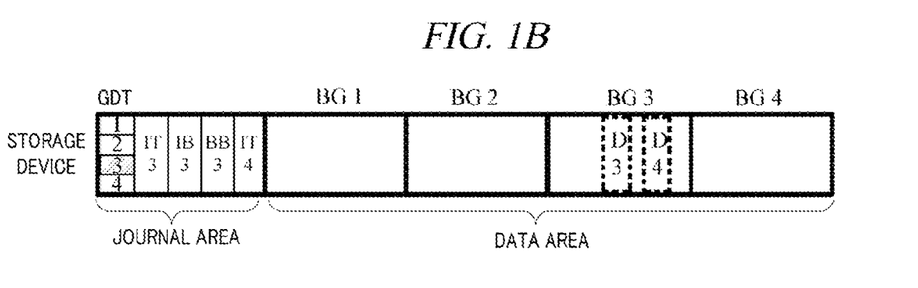
FIG. 1B is an illustrative diagram of an fsync system call processing process using ordered mode journaling in conventional EXT4.

FIG. 1A and FIG. 1B is an illustrative diagram of the fsync system call processing process using ordered mode journaling in conventional EXT4.

EXT4 is a journaling file system of LINUX. EXT4 periodically stores metadata of a file in a pre-reserved journal area of an inactive memory, in order to guarantee reliability and consistency of the file system. In this case, the journal area is an area pre-reserved in a nonvolatile memory.

The storage device of FIG. 1B includes one journal area and one data area. For example, the data area may consist of four block groups indicated as 'BG1,' 'BG2,' 'BG3,' and 'BG4.' In the compound transaction of FIG. 1A, there are present eight metadata, for which journaling will be executed. In addition, in a page cache, there are present data 'D2,' 'D2,' 'D3,' and 'D4' for four files, which have not yet been recorded in the storage device of FIG. 1A.

In this case, the compound transaction may include metadata such as an inode table, a block bitmap, an inode bitmap, and a group descriptor table (GDT) for a corrected file. In addition, the inode table is metadata recording information of a file, the bitmap table is metadata recording allocation of a file, and the block bitmap is metadata recording data block allocation within a block group.

In FIG. 1A, when an fsync system call for 'File 3' occurs, the conventional ordered mode journaling calls a journaling thread and executes journaling for the compound transaction. In this case, the fsync system call is a calculation that a user requests to the system in order to be guaranteed that all corrected data for one file have been recorded in the storage device. The fsync system call is used to store a file, which is frequently updated and should be assured to be stored in the storage device at a certain time, like an XML setting file of data or applications to be stored in a database.

Unlike general journaling, the fsync system call is not executed in a background upon execution thereof. That is, the fsync system call waits until the journaling thread is called, and all data present in the page cache are stored in the data area. Thus, the conventional ordered mode journaling of FIG. 1A waits for the time when all the data 'D1,' 'D2' and 'D4,' for 'File 1,' 'File 2' and 'File 4,' in addition to 'D3' for 'File 3,' are stored in the data area. After all the data are written in the data area, all metadata present in the compound transaction are recorded in the journal area. Since the conventional ordered mode journaling should store even the data for the files irrelevant to 'File 3' in the data area, the response time of fsync increases.

In order to solve this problem, the conventional ordered mode journaling may reduce the time required for fsync by separating a transaction for a file executing fsync from the compound transaction and executing journaling therefor. However, since the metadata present in the compound transaction are a final version reflecting all corrections, separating only the transaction for the file executing fsync from the metadata violates the consistency.

For example, in FIG. 1A and FIG. 1B, 'File 3' and 'File 4' correct an identical block bitmap 'BB3.' Thus, when an fsync system call for 'File 3' is executed without update of 'File 4,' the conventional ordered mode journaling records 'BB3' of 'File 4' in the journal area, and thus, the file system is in the state of inconsistency. That is, to maintain the consistency, a method for executing journaling by separating a block-group-level transaction from the compound transaction is necessary.

Next, the fsync system call processing process of the method of per-block-group journaling for the ordered model journaling file system in accordance with an example embodiment is described with reference to FIG. 2 to FIG. 4.

Figure 2:
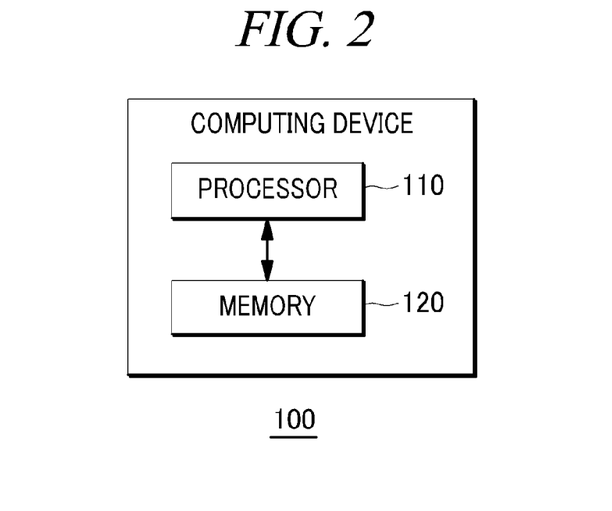
FIG. 2 is a configuration diagram schematically illustrating a computing device in accordance with an example embodiment.

FIG. 2 is a configuration diagram schematically illustrating a computing device in accordance with an example embodiment.

With reference to FIG. 2, the computing device 100 in accordance with an example embodiment may include a memory 120 equipped with a program operating a file system supporting ordered mode journaling and a processor 110 that operates a program stored in a memory.

The computing device 100 may include a general computer such as a server, a workstation, a desktop computer and a laptop computer, and the latest smart device such as a smart phone and a tablet PC.

The memory 130 generally refers to a volatile and nonvolatile storage device that continuously maintains stored information even when no supply is supplied. For example, the memory 130 may include a NAND flash memory such as a compact flash (CF) card, a secure digital (SD) card, a memory stick, a solid-sate drive (SSD), and a micro SD card or a magnetic computer storage device such as a hard disk drive (HDD).

A program stored in the memory 120 may perform as an operation system that operates a file system, to which the example embodiments are applied, or be configured in an application form equipped with a file system, to which the example embodiments are applied.

When an fsync system call for a file stored in the memory 120 occurs, the processor 110 of the computer device 100 in accordance with an example embodiment may extract a block-group-level transaction corresponding to the file from the compound transaction including the file, according to execution of a program. After the extraction of the block-group-level transaction, the processor 110 may record the transaction in the data area of the memory 120, and execute journaling of the transaction in the journal area of the memory 120. In this case, the execution of the journaling may mean to store the transaction in the journal area of the memory 120.

In addition, the block-group-level transaction may include at least one file included in a block, in which block group files are stored, and metadata of the file stored in the block. In this case, the processor 110 may record the file included in the transaction in the data area of the memory 120, according to execution of a program. In addition, the processor 110 may record the metadata included in the transaction in the journal area of the memory 120.

When an fsync system call for a random file occurs as in the conventional journaling method, the processor 110 may call the journaling thread to execute journaling and wait until the execution of the journaling is finished. Thus, the processor 110 may extract a transaction corresponding to a file executing fsync from the compound transaction to execute journaling. Since the processor 110 executes journaling only by using the corresponding transaction, it can reduce response time of an application using an fsync system call, compared to the conventional journaling method that executes journaling for all corrected files.

Figure 3A:
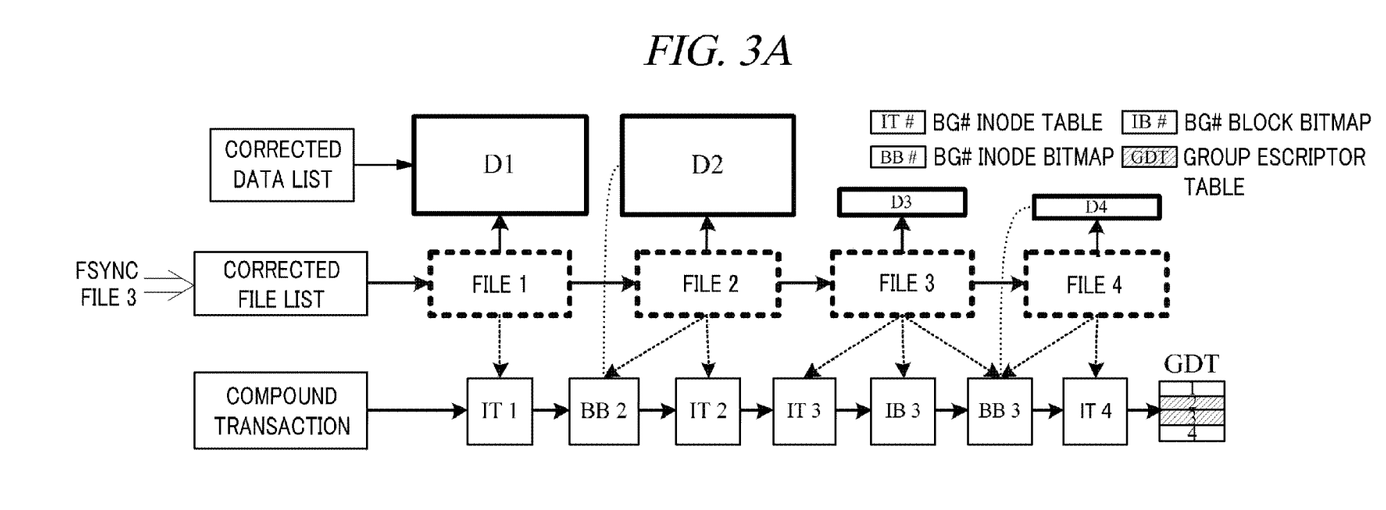
FIG. 3A is an illustrative diagram of an fsync system call processing process of per-block-group journaling for an ordered mode journaling file system in accordance with an example embodiment.
Figure 3B:
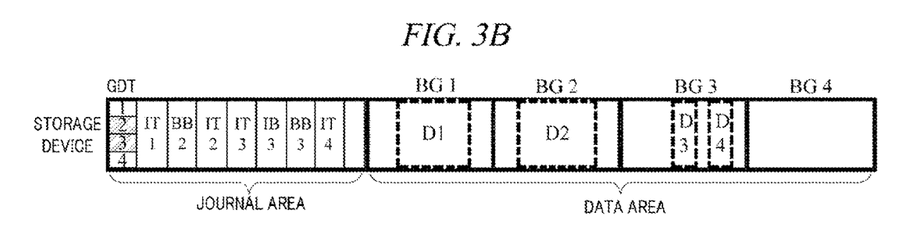
FIG. 3B is an illustrative diagram of an fsync system call processing process of per-block-group journaling for an ordered mode journaling file system in accordance with an example embodiment.

FIG. 3A and FIG. 3B is an illustrative diagram of the fsync system call processing process of the per-block-group journaling for the ordered mode journaling file system in accordance with an example embodiment.

As shown in FIG. 3A and FIG. 3B, the compound transaction includes metadata reflecting all corrections of corrected files. Thus, to maintain the consistency, the processor 110 may extract not only metadata for a file executing the sync system call but also metadata for a file stored in an identical block from the compound transaction and generate a block-group-level transaction.

When an fsync system call for 'File 3' is executed, the processor 110 may extract a block-group-level transaction corresponding to 'File 3' from the compound transaction. In this case, the block group 'BG3' including 'File 3' includes 'File 4' together with 'File 3.' Thus, the block-group-level transaction may include metadata 'IT3,' 'IB3,' 'BB3' and 'IT4' for 'File 3' and 'File 4.'

After the extraction of the block-group-level transaction corresponding to 'File 3,' the processor 110 may store 'File 3' and 'File 4' in 'BG3' of the data area. In this case, the metadata 'IT3,' 'IB3,' 'BB3' and 'IT4' for 'File 3' and 'File 4' are stored in the journal area of the memory, and on this basis, the processor 110 may execute transaction journaling.

In the per-block-group journaling, processing a group descriptor table shared among multiple block groups is critical. In the block group descriptor table of the compound transaction of FIG. 3B, "Block Group 2' and 'Block Group 3' may be corrected together. If the block group descriptor table is recorded as it is in the journal area, it violates the consistency of the file system.

In order to solve this problem, the memory 120 of the computer device 100 in accordance with an example embodiment may include a buffer storing the group descriptor table of the journal area of the memory 120. The group descriptor table stored in the buffer may be used to maintain the consistency of the file system, when the per-block-group journaling is executed.

When an fsync system call occurs, the processor 110 may copy the group descriptor table of the journal area in the buffer of the memory 120, according to execution of a program. In addition, when per-block-group journaling for a transaction is executed, update of the group descriptor table of the journal area may be executed by using the group descriptor table copied in the buffer.

A group descriptor table processing process in accordance with an example embodiment is described with reference to the example of FIG. 4.

Figure 4:
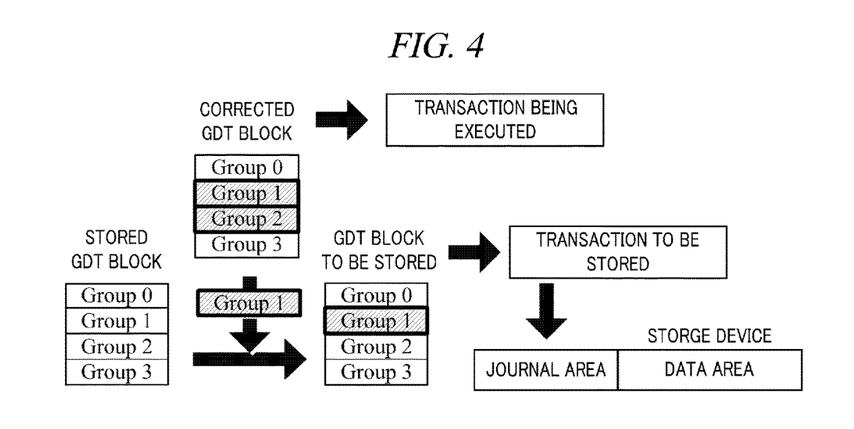
FIG. 4 is an illustrative diagram of a group descriptor table processing process of per-block-group journaling in accordance with an example embodiment.

FIG. 4 is an illustrative diagram of a group descriptor table processing process of the per-block-group journaling in accordance with an example embodiment.

In FIG. 4, 'GDT' means the group descriptor table. The example of FIG. 4 has a group descriptor table block stored in the journal area of the memory 120 and a group descriptor table block, in which 'Group 1' and 'Group 2' have been corrected. In this case, directly recording the corrected group descriptor table block in the journal area may violate the consistency. Thus, the processor 110 may reflect only updated information in the block-group-level transaction and record the information in the journal area. If 'Group 1' in the block-group-level transaction has been updated, the group descriptor table block to be stored in the journal area may be the group descriptor table block, in which only information of 'Group 1' in the previously stored group descriptor table block has been upgraded. The processor 110 may reflect the group descriptor table block to generate a block-group-level transaction, and store the transaction in the journal area.

The compound transaction of the memory 120 in accordance with an example embodiment may include first and second files located in different data area blocks. In this case, when an fsync system call for the first file occurs, the processor 110 may extract the first file and a first block-group-level transaction corresponding to the first file from the compound transaction, according to execution of a program. After the extraction of the first block-group-level transaction, the processor 110 records the first file in a first block group of the data area of the memory 120. In addition, the processor 110 may execute journaling of the first block-group-level transaction in the journal area of the memory 120. After the execution of the journaling, the processor 110 may delete the first block-group level transaction from the compound transaction.

In addition, after the execution of the journaling for the first block-group-level transaction, when journaling for the compound transaction is executed by using the file system, the processor 110 may store the second file in a second block group of the data area, and execute the journaling of the compound transaction in the journaling area.

Meanwhile, the processor 110 for executing the block-group-level transaction may generate a block group according to a preset type of a file. In this case, the preset type of the file may be a database file having extensions of 'db,' 'db-journal,' 'db-wal' and 'db-shm,' or an XML file storing data or setting values. In addition, the preset type of the file may be a type of a file preset according to a user of the computing device 100 or needs from the computing device 100.

The preset type of the file may be one or more files that can be generated by a preset system or application. For example, the preset type of the file may be set to data and a setting file generated by a certain database management system (DBMS).

In addition, the processor 110 may generate one or more separate block groups for allocating a file, which is not included in the preset type of the file.

When a file is generated or renew of a file occurs, the processor 110 may allocate a block group according to a type of the file. For example, if a newly generated file is included in the preset type of the file, the processor 110 may allocate the generated file to a block group corresponding to the type of the generated file. In addition, if the newly generated file is not included in the preset type of the file, the processor 110 may allocate the generated file to any one of the one or more separate block groups for allocating a file, which is not included in the preset type of the file.

When an fsync system call for the file allocated to the block group occurs, the processor 110 may extract a block-group-level transaction from the block group, to which the file has been allocated, and execute journaling therefor. Since a transaction may be executed in a block group unit allocated in advance according to a type of a file, the processor 110 may separate only a relevant transaction upon an fsync system call, and execute journaling therefor.

Next, the method of the per-block-group journaling for the ordered mode journaling file system of the computer device 100 is described with reference to FIG. 5 and FIG. 6.

Figure 5:
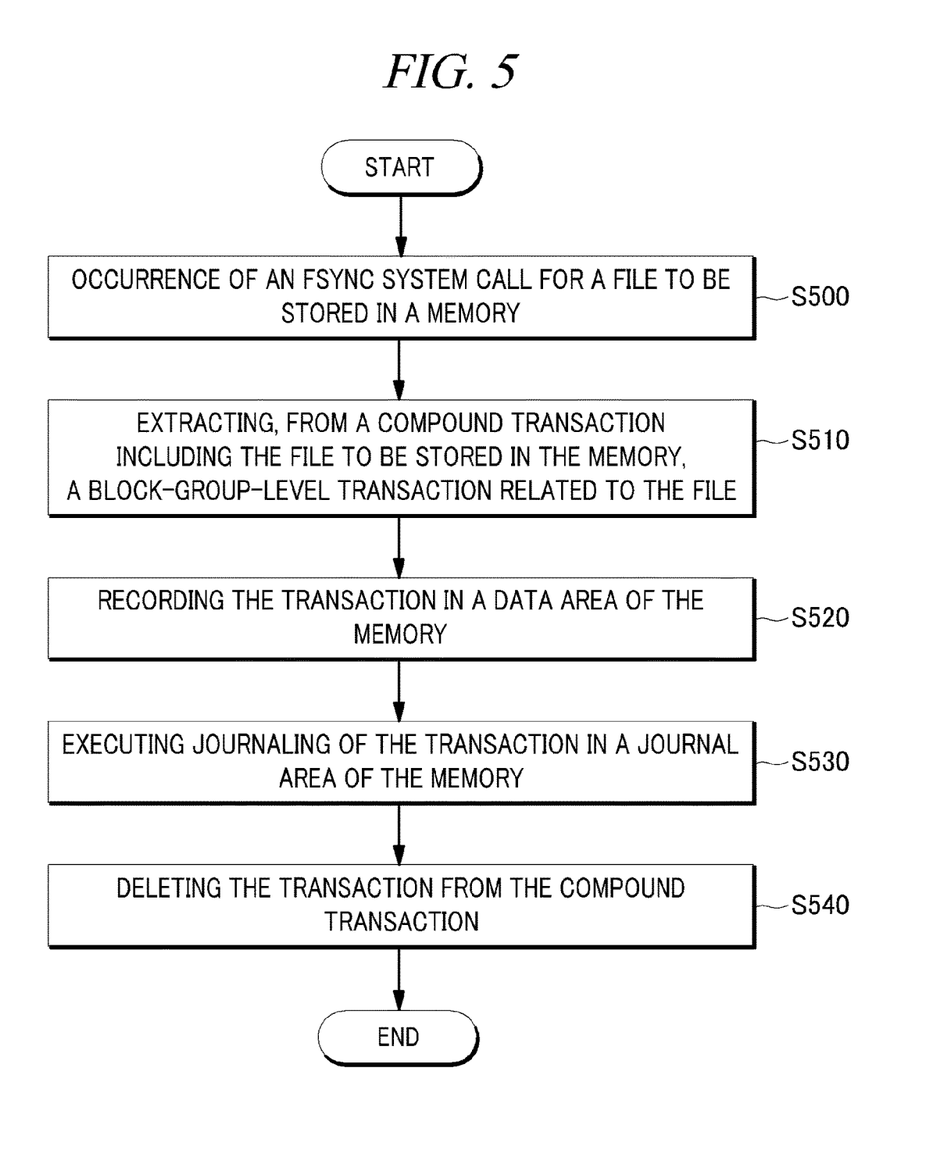
FIG. 5 is a flow chart of a per-block-group journaling method for an ordered mode journaling file system in accordance with an example embodiment.

FIG. 5 is a flow chart of the method of the per-block-group journaling for the ordered mode journaling file system in accordance with an example embodiment.

When an fsync system call for a file stored in the memory 120 occurs (S500), the computer device 100 may extract, from the compound transaction including the file stored in the memory 120, a block-group-level transaction corresponding to the file, according to the fsync system call (S510).

After the extraction of the transaction, the computer device 100 may record the transaction in the data area of the memory (S520), and execute journaling of the transaction in the journal area (S530). Since the computer device 100 executes the journaling by using only the corresponding block-group-level transaction upon the execution of the fsync system call, it can reduce time required to execute the journaling, compared to the conventional ordered mode journaling.

In addition, the block-group-level transaction corresponding to the file may include one or more files included in a block, in which files are stored, and metadata of the file stored in the block, as described above with reference to FIG. 2. In this case, the computer device 100 uses the file included in the transaction to record the transaction in the data area of the memory 120 (S520). The computer device 100 may also use the metadata included in the transaction to execute journaling of the transaction in the journal area of the memory 120 (S530).

After the execution of the journaling for the block-group-level transaction, the computer device 100 may delete the transaction from the compound transaction (S540).

When an fsync system call for the file stored in the memory 120 occurs (S500), the computer device 100 may copy the group descriptor table of the journal area in the buffer of the memory 120. In addition, in order to execute the transaction in the journal area of the memory 120 (S530), the computer device 100 may execute update for the block group by using the group descriptor table copied in the buffer. The computer device 100 may also update the group descriptor table of the journal area by using the group descriptor table of the buffer.

The group descriptor table stored in the buffer may be used to maintain the consistency when the per-block-group journaling is executed, as described above.

Meanwhile, with respect to the compound transaction including the first and second files located in the blocks of the different data areas, when an fsync system call for the first file occurs, the computer device 100 may extract the first file and a block-group-level transaction corresponding to the first file from the compound transaction, according to the fsync system call. The computer device 100 may record the first block-group-level transaction in the data area of the memory and execute journaling of the transaction in the journal area of the memory. When the journaling is completed, the computer device 100 may delete the first block-group-level transaction from the compound transaction.

For further description with reference to, for example, FIG. 3, in the ordered mode journaling method of the file system, the first file may be 'File 3', and the second file may be 'File 1'. When an fsync system call for 'File 3', which is the first file, occurs, the computer device 100 may extract 'File 3' and a first block-group-level transaction for the block group BG3 including 'File 3' from the compound transaction, according to the fsync system call. In this case, the extracted first block-group-level transaction may be 'File 3', 'File 4' and metadata for each of the files. The computer device 100 may execute journaling by using the extracted first block-group-level transaction. When the journaling is completed, the computer device 100 may delete the first block-group-level transaction from the compound transaction. That is, only 'File 1', 'File 2' and metadata for each of the files are left in the compound transaction at the time that the journaling is completed.

In addition, the computer device 100 may execute journaling for the compound transaction. In this case, the computer device 100 may store the second file in the second block group of the data area to execute the journaling for the compound transaction. The computer device 100 may also execute the journaling of the compound transaction in the journal area of the memory.

Returning to the example of FIG. 3, the computer device 100 may execute journaling for the compound transaction, from which the first-block-group-level transaction has been deleted. In this case, 'File 1' as the second file may be stored in the second block group 'BG1'. In addition, the metadata of the second file may be stored in the journal area of the storage device.

Figure 6:
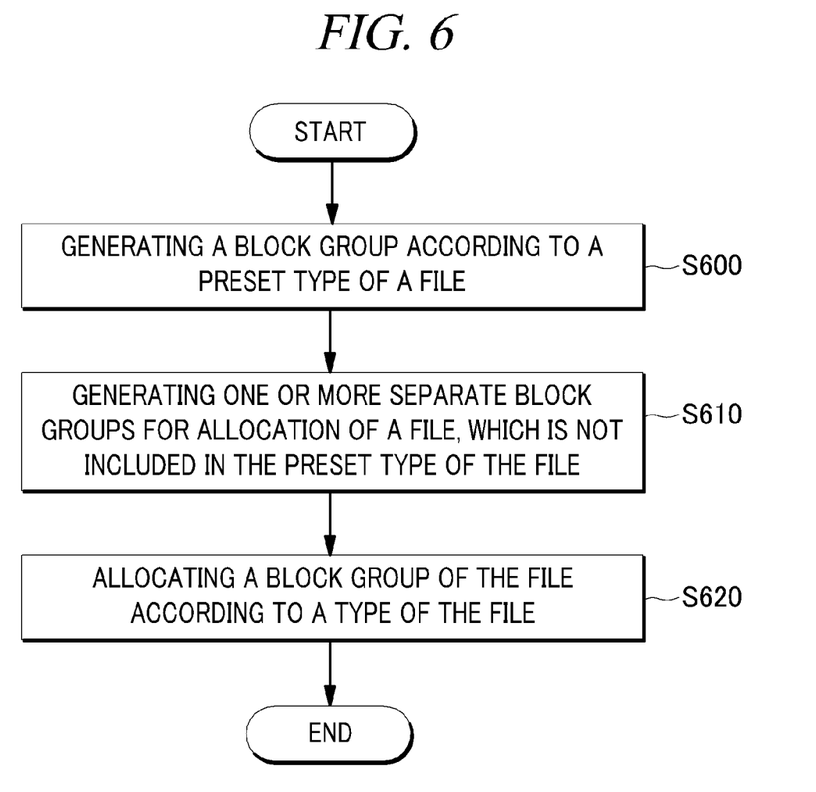
FIG. 6 is a flow chart of a block group generating method in accordance with an example embodiment.

FIG. 6 is a flow chart of a block group generating method in accordance with an example embodiment.

Meanwhile, the computing device 100 may generate a block group according to a preset type of a file, in order to execute the block-group-level transaction (S600). In this case, the preset type of the file may be a file storing data such as a database file or an XML file.

The computing device 110 may generate one or more separate block groups to allocate a file, which is not included in the preset type of the file, in addition to a block group according to the preset type of the file (S610).

When a file is generated or renewal of a file occurs, the computing device 100 may allocate a block group according to a type of the file (S620). For example, if a newly generated file is included in the preset type of the file, the processor 110 may allocate the generated file to a block group corresponding to the type of the generated file. In addition, if the newly generated file is not included in the preset type of the file, the processor 110 may allocate the generated file to any one of the one or more separate block groups for allocating a file, which is not included in the present type of the file.

In addition, when an fsync system call for the file allocated to the block group occurs, the computing device 100 may extract a block-group-level transaction from the block group, to which the file has been allocated, and execute journaling therefor. Since a transaction may be executed in a block group unit allocated in advance according to a type of a file, the computing device 100 may separate only a relevant transaction upon an fsync system call, and execute journaling therefor.

Since the method and the apparatus 100 of the per-block-group journaling for the ordered mode journaling file system in accordance with an example embodiment executes journaling for a block-group-level transaction corresponding to a corresponding file upon an fsync system call, it can improve a processing speed of the fsync system call, and maintain the consistency of the file system. Further, since the method and the apparatus 100 of the per-block-group journaling for the ordered mode journaling file system may delete the processed transaction from the compound transaction, it can process files and metadata, which have not been processed at the time of common journaling and remained within the compound transaction.

Example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the example embodiments have been described in relation to the certain examples. However, the components or parts or all the operations of the method and the system may be embodied using a computer system having universally used hardware architecture.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

The invention claimed is:

1. A computing device, comprising:
   a memory equipped with a program operating a file system supporting ordered mode journaling; and
   a processor operating the program that is stored in the memory, wherein according to execution of the program, when a file synchronization (fsync) system call for a first file stored in the memory is requested, the processor is configured to:
   generate a block-group-level transaction, corresponding to the first file, by extracting first meta data for the first file from a compound transaction including the first file, and by extracting second meta data for a second file from the compound transaction in response to the second file being determined to be stored in a block of the memory identical to a block storing the first file;
   record the generated block-group-level transaction in a data area of the memory; and
   perform the ordered mode journaling by storing the generated block-group-level transaction in a journal area of the memory.

2. The computing device of claim 1,
   wherein the block-group-level transaction comprises one or more files included in the block storing the first file and the meta data of the first file, and
   wherein the processor is further configured to:
   record the first file, included in the generated block-group-level transaction, to the data area; and
   store the metadata meta data of the first file, included in the generated block-group-level transaction, to the journal area.

3. The computing device of claim 1,
   wherein after the storing of the generated block-group-level transaction, the processor is further configured to delete data corresponding to the generated block-group-level transaction, from the compound transaction.

4. The computing device of claim 1,
   wherein the memory comprises a buffer that stores a group descriptor table of the journal area, and according to the execution of the program, and when the fsync system call is requested, the processor is further configured to:
  copy the group descriptor table of the journal area in the buffer;
  perform an update for the block by using the group descriptor table, which is copied in the buffer; and
  updating the group descriptor table by using the group descriptor table of the buffer when storing the generated block-group-level transaction.

5. The computing device of claim 1,
wherein in response to the second file being determined to be stored in a different block of the memory from the block storing the first file in the compound transaction of the memory, and when the fsync system call for the first file is requested, the processor is further configured to:
  extract the first file and a first block-group-level transaction corresponding to the first file from the compound transaction;
  record the first file in a first block group of the data area of the memory;
  store the first block-group-level transaction in the journal area of the memory; and
  delete the first block-group-level transaction from the compound transaction.

6. The computing device of claim 5,
wherein when journaling for the compound transaction is executed by using the file system, the processor is further configured to:
  store the second file in a second block group of the data area, and
  store the compound transaction in the journal area.

7. The computing device of claim 1,
wherein the processor generates a block group according to a preset file type, and
when a type of the first file corresponds to the preset file type, the processor is further configured to allocate the first file to a block group corresponding to the type of the first file.

8. The computing device of claim 7,
wherein the preset file type comprises either one or both of a database file and an XML file.

9. An ordered mode journaling method of a file system, comprising:
  when a file synchronization (fsync) system call for a first file stored in a memory of the file system is requested, generating, by a processor, a block-group-level transaction, corresponding to the first file, by extracting first meta data for the first file from a compound transaction including the first file, and by extracting second meta data for a second file from the compound transaction in response to the second file being determined to be stored in a block of the memory identical to a block storing the first file;
  recording, by the processor, the generated block-group-level transaction in a data area of the memory; and
  performing, by the processor, the ordered mode journaling by storing the generated block-group-level transaction in a journal area of the memory.

10. The ordered mode journaling method of a file system of claim 9,
wherein the block-group-level transaction corresponding to the file comprises one or more files included in the block storing the first file, and the meta data of the first file, and
wherein the method further comprises:
  recording, by the processor, the first file, which is included in the generated block-group-level transaction, to the data area of the memory; and
  storing, by the processor, the meta data of the first file, included in the generated block-group-level transaction, to the journal area of the memory.

11. The ordered mode journaling method of a file system of claim 9, further comprising:
  deleting, by the processor, data corresponding to the generated block-group-level transaction, from the compound transaction, after the storing of the generated block-group-level transaction to the journal area of the memory.

12. The ordered mode journaling method of a file system of claim 9, further comprising:
  copying, by the processor, a group descriptor table of the journal area in a buffer of the memory,
  wherein the storing of the transaction in the journal area of the memory comprises:
    executing an update for the block by using the group descriptor table, which is copied in the buffer; and
    updating the group descriptor table of the journal area by using the group descriptor table of the buffer.

13. The ordered mode journaling method of a file system of claim 9,
wherein in response to the second file being determined to be stored in a different block of the memory from the block storing the first file in the compound transaction, and when the fsync system call for the first file is requested, the ordered mode journaling method of the file system further comprises:
  extracting, by the processor, the first file and a first block-group-level transaction corresponding to the first file from the compound transaction;
  recording, by the processor, the first block-group-level transaction in the data area of the memory;
  storing, by the processor, the first block-group-level transaction in the journal area of the memory; and
  deleting, by the processor, the first block-group-level transaction from the compound transaction.

14. The ordered mode journaling method of a file system of claim 13, further comprising:
  executing, by the processor, journaling for the compound transaction,
  wherein the executing of the journaling for the compound transaction comprises:
    storing the second file in a second block group of the data area; and
    storing the compound transaction in the journal area of the memory.

15. The ordered mode journaling method of a file system of claim 9, further comprising:
  generating, by the processor, a block group according to a preset file type; and
  allocating, by the processor, a file, when a type of the file is determined to correspond to the preset file type, in a block group corresponding to the type of the file.

* * * * *